United States Patent
Fernandes et al.

(10) Patent No.: US 7,486,697 B2
(45) Date of Patent: Feb. 3, 2009

(54) METHOD FOR NEGOTIATING LINK PROTOCOLS FOR LINK AGGREGATIONS

(75) Inventors: Lilian Sylvia Fernandes, Austin, TX (US); Vinit Jain, Austin, TX (US); Jorge Rafael Nogueras, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 10/855,731

(22) Filed: May 27, 2004

(65) Prior Publication Data

US 2005/0265384 A1 Dec. 1, 2005

(51) Int. Cl.
*H04J 3/22* (2006.01)
(52) U.S. Cl. ..................................................... 370/468
(58) Field of Classification Search .................. 370/466, 370/477
See application file for complete search history.

(56) References Cited

U.S. PATENT DOCUMENTS

2003/0067928 A1* 4/2003 Gonda ........................ 370/401
2003/0128706 A1* 7/2003 Mark et al. ............... 370/395.1
2004/0085894 A1* 5/2004 Wang et al. ................. 370/216
2005/0122897 A1* 6/2005 Gonda ........................ 370/216

OTHER PUBLICATIONS

IEEE standard 802.3ad-2000, "Aggregation of Multiple Link Segments", Mar. 30, 2000.*
"Part 3: Accessing Method and Physical Layer Specification for Carrier Sense Multiple Accesss/Collision Avoidance (CSMA/CD)", Section 3, LAN/MAN Standard Committee, IEEE Std. 802.3-2002, Dec. 31, 2002, p. 282-379.

* cited by examiner

*Primary Examiner*—Seema S. Rao
*Assistant Examiner*—Jianye Wu
(74) *Attorney, Agent, or Firm*—Duke W. Yee; Diana R. Gerhardt; Lisa L. B. Yociss

(57) ABSTRACT

A method for negotiating a protocol for a conversation in which data packets are transmitted. Responsive to establishment of a link aggregation with an endpoint for the conversation, an algorithm for processing the data packets in the conversation is selected to form a preferred algorithm. A request is sent to the endpoint. This request indicates the preferred algorithm for processing the data packets in the conversation. A reply to the request is received from the endpoint. A determination is made as to whether a convergence has occurred. The data packets in the conversation are processed using the preferred algorithm in response to a determination that the convergence has occurred.

6 Claims, 5 Drawing Sheets

METHOD FOR NEGOTIATING LINK PROTOCOLS FOR LINK AGGREGATIONS

BACKGROUND OF THE INVENTION

1. Technical Field

The present invention relates generally to an improved data processing system and in particular to a method and apparatus for processing data. Still more particularly, the present invention relates to a method, apparatus, and computer instructions for transferring data using link aggregation.

2. Description of Related Art

With the increasing demand for higher rates of data transfer, 1 G bit/sec is not enough bandwidth for many network connections between local area network (LAN) switches and from switches to high-demand network servers. Along with the bandwidth-consuming applications at Internet service providers (ISPs), application service providers, streaming media providers and the like, traditional network administrators may also be feeling the bandwidth pinch at their server connections. Trunking or link aggregation has been used to increase bandwidth. Link aggregation involves allowing a data processing system to treat more than one network interface as a single network interface. In other words, a number of different links between data processing systems may be "aggregated" into a single link.

In addition to increased bandwidth, link aggregation provides for increased reliability. Traditionally, to aggregate more than one network interface required manual intervention from the network administrator. The administrator has to specify the interfaces to be aggregated on both the host (e.g. an AIX server) and on the switch where the network adapters are connected. This specification is necessary because the switch needs to know that the traffic addressed to the link aggregation can be sent over any of the adapters belonging to the aggregation.

Efforts have been made to automate the creation of link aggregation, such as the IEEE 802.3ad standard. This standard defines a Link Aggregation Control Protocol (LACP) whereby the network host and the switch exchange Link Aggregation Control Protocol Data Unit (LACPDU) packets to decide which adapters are to be aggregated together. Intrinsic properties of the adapters (like duplexity and link speed) are used to decide which adapters belong to the same link aggregation.

The IEEE 802.3ad standard specifies that all packets belonging to the same conversation must be sent over the same adapter to prevent packet reordering at the link level. The way this transfer of data for a conversation is achieved is implementation-dependent. A conversation is a transfer of related data between two endpoints. An example of a conversation is a session between two hosts. A session is the active connection between two data processing systems. Furthermore, the host and the switch can use different schemes to decide over which adapter the packets belonging to the same conversation are sent. This situation means that it is quite possible that data packets sent from the host to the switch are sent over one adapter, but reply data packets sent from the switch back to the host are sent over another adapter. This sending of data packets is allowed by the standard, since in both directions packet reordering does not occur. In traditional network stacks this situation is not an issue.

However, when dealing with transmission control protocol (TCP)-offloaded adapters, such a situation could potentially become a problem. In TCP-offloaded adapters the TCP/Internet protocol (IP) is implemented in the adapter's hardware. Thus, the state for all the TCP connections going over a specific adapter is contained in that adapter, and not in a system-wide TCP layer that is shared among all the connections on the same host.

This configuration makes it imperative that reply data packets are received on the same adapter over which the outgoing data packets were sent because only that adapter is aware of the TCP state necessary to accept and process said reply packets. For example, if a data packet is sent on adapter 1 but its reply is received on adapter 2, the latter adapter does not have the TCP state necessary to process the reply packet. As a result, the reply would then be discarded. Examples of TCP state information includes expected sequence number and timeout information.

In the automated link aggregation standards in existence, no way is present for a host and a switch to negotiate which algorithm should be employed to decide which adapter should be used to send packets belonging to the same conversation. Therefore, it would be advantageous to have an improved method, apparatus, and computer instructions for forming a link aggregation.

SUMMARY OF THE INVENTION

The present invention provides a method for negotiating a protocol for a conversation in which data packets are transmitted. Responsive to establishment of a link aggregation with an endpoint for the conversation, an algorithm for processing the data packets in the conversation is selected to form a preferred algorithm. A request is sent to the endpoint. This request indicates the preferred algorithm for processing the data packets in the conversation. A reply to the request is received from the endpoint. A determination is made as to whether a convergence has occurred. The data packets in the conversation are processed using the preferred algorithm in response to a determination that the convergence has occurred.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
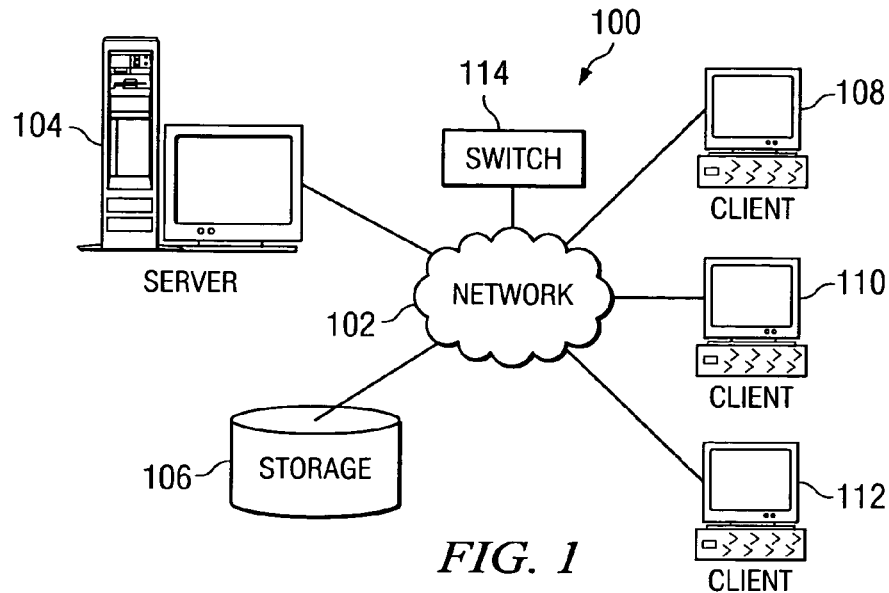
FIG. 1 is a network of data processing systems in which the present invention may be implemented.

With reference now to the figures, FIG. 1 depicts a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers or personal digital assistants (PDA) devices. In the depicted example, server 104 provides data, such as boot files, operating system images, and applications to clients 108-112. Clients 108, 110, and 112 are clients to server 104. Server 104 may act as an instant messaging server to facilitate the exchange of messages between users at clients, such as clients 108, 110, and 112. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
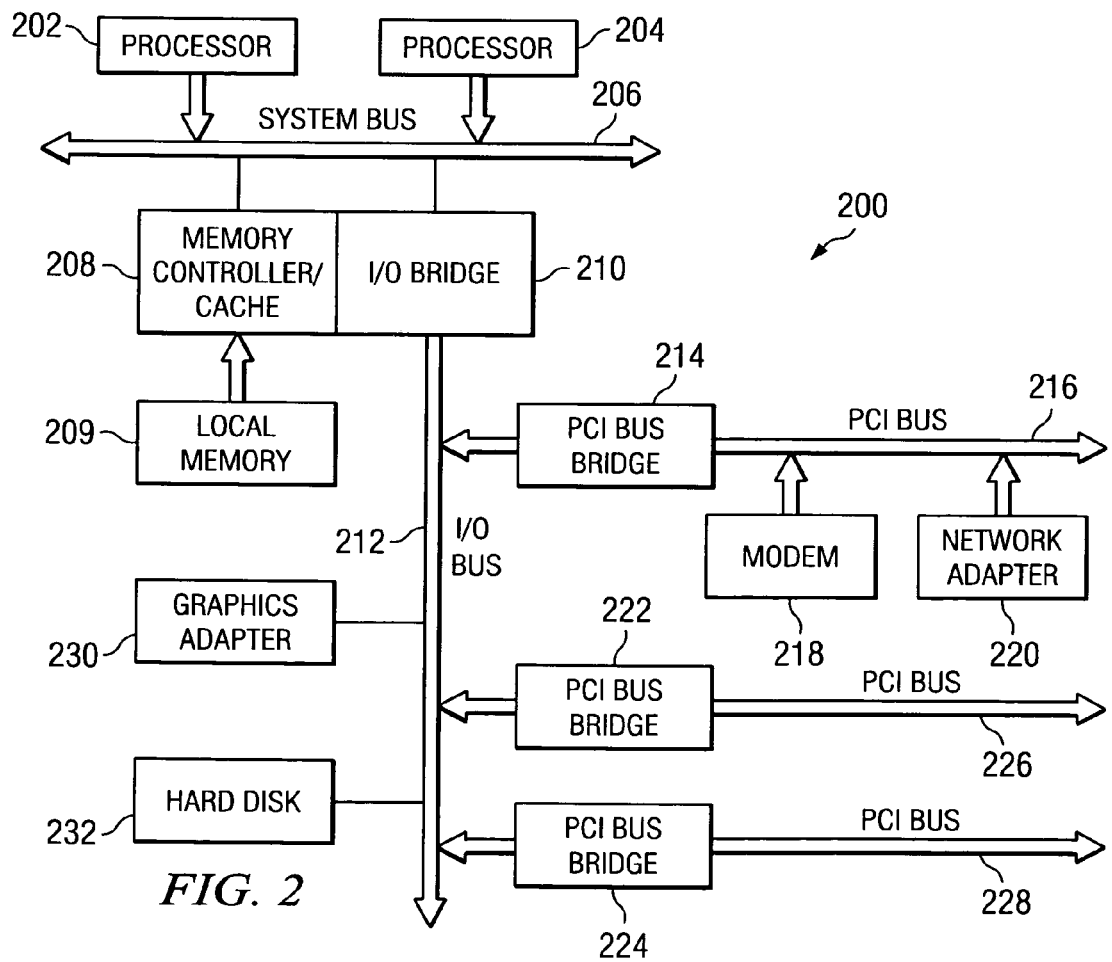
FIG. 2 is a block diagram of a data processing system that may be implemented as a server, in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, New York, running the Advanced Interactive Executive (AIX) operating system or LINUX operating system.

Figure 3:
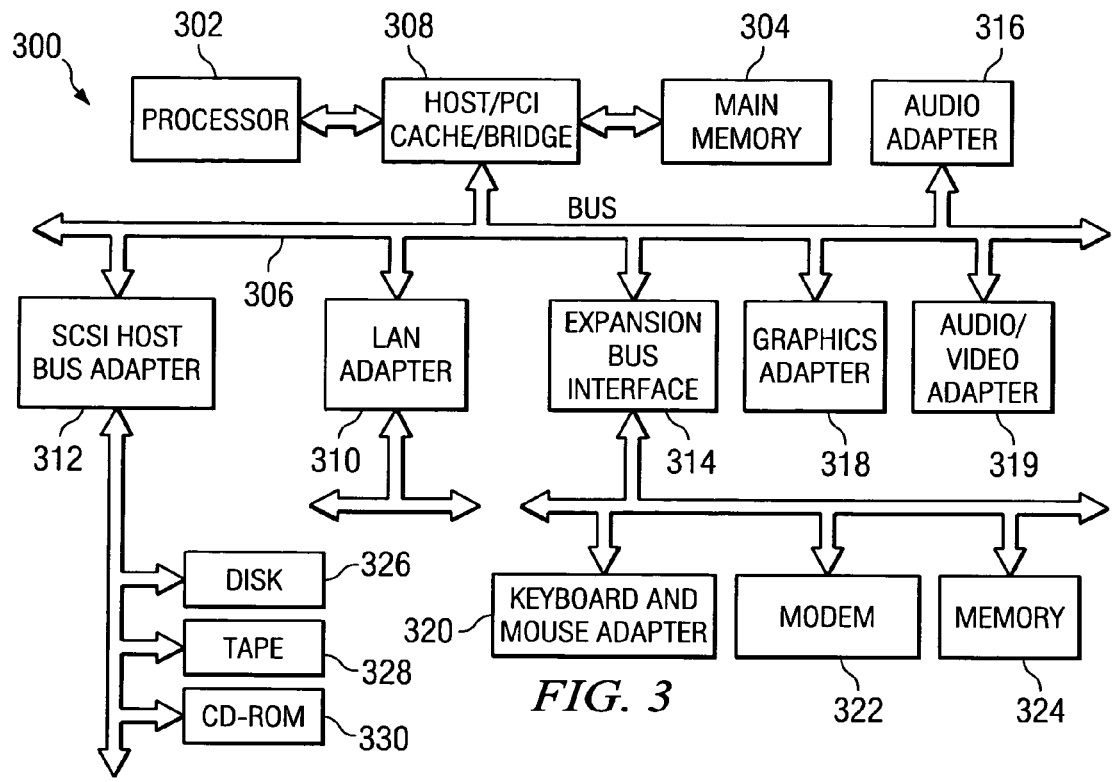
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for negotiating a protocol to process data packets in link aggregations. A mechanism of the present invention provides an algorithm negotiation protocol that operates with or over existing link aggregation protocols, such as, for example, the IEEE standard 802.3ad. The existing link aggregation protocols deal with which adapters belong to a specific aggregation group. The mechanism of the present invention is used to identify an algorithm or process used to transfer data packets over the link aggregation.

Figure 4:
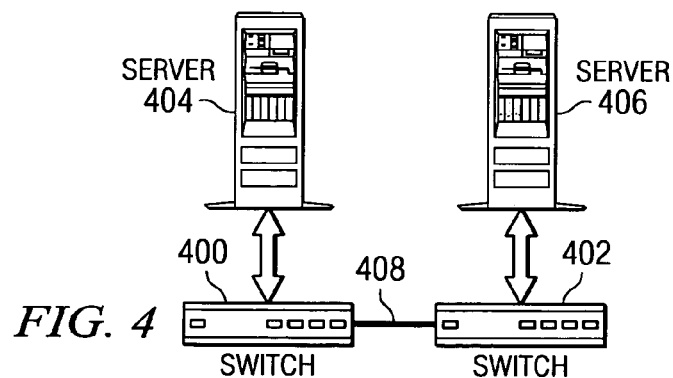
FIG. 4 is a diagram of components in which a preferred embodiment of the present invention may be implemented.

Turning to FIG. 4, a diagram of components is depicted in which a preferred embodiment of the present invention may be implemented. In this example, switch 400 and switch 402 are used to send data between server 404 and server 406. These servers may be implemented using a data processing system, such as data processing system 200 in FIG. 2. Link aggregation 408 is present for adapters in switch 400 and switch 402. The mechanism of the present invention is used to select an algorithm or process for handling data packets transferred across link aggregation 408. In this particular example, the protocol for algorithm negotiation may be implemented in computer instructions contained within switch 400 and switch 402.

Figure 5:
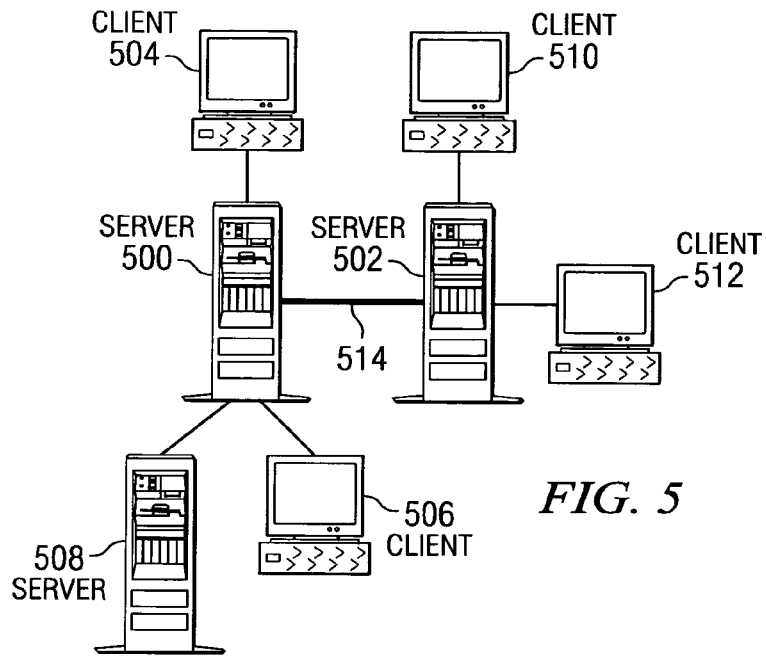
FIG. 5 is another example of components in which a preferred embodiment of the present invention may be implemented.

With reference to FIG. 5, another example of components is illustrated in which a preferred embodiment of the present invention may be implemented. As shown, server 500 and server 502 provide a connection to transfer data between client 504, client 506, server 508, client 510, and client 512. Link aggregation 514 is present to provide for the desired bandwidth. The process or algorithm used to process data packets transferred through link aggregation 514 is implemented within server 500 and server 502 in these illustrative examples.

Figure 6:
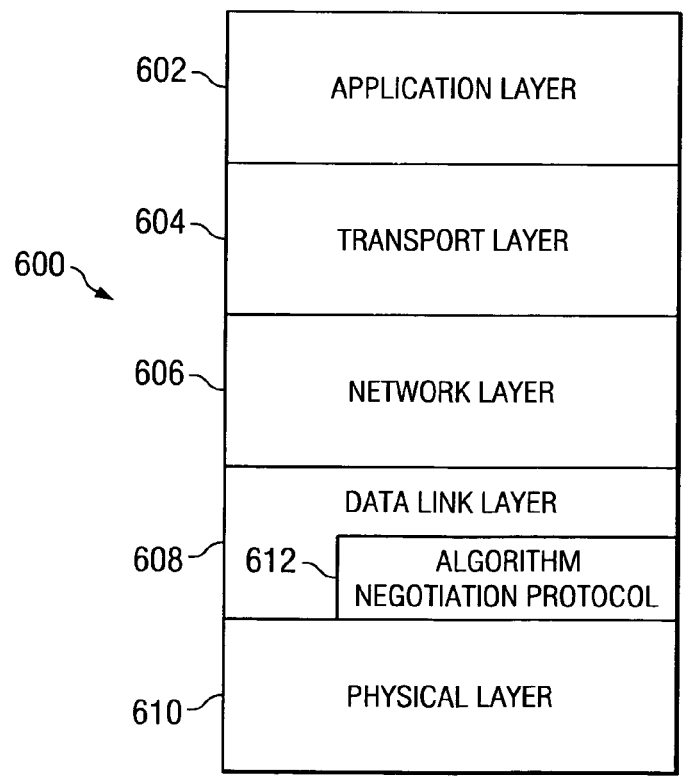
FIG. 6 is a diagram of a protocol stack in accordance with a preferred embodiment of the present invention.

With reference now to FIG. 6, a diagram of a protocol stack is depicted in accordance with a preferred embodiment of the present invention. Protocol stack 600 is an example of a TCP/IP stack in these examples. Protocol stack 600 includes application layer 602, transport layer 604, network layer 606, data link layer 608, and physical layer 610. Application layer 602 is the top layer in protocol stack 600 and defines the language and syntax programs use to communicate with other programs. Transport layer 604 ensures delivery for the entire file or message. This layer is responsible for the overall end to end validity and integrity in the transmission for a conversation.

Network layer 606 is used to route data between different endpoints. Data link layer 608 is responsible for transmitting data packets between nodes. Physical layer 610 is responsible for sending and receiving bits for the connecting medium. Algorithm negotiation protocol 612 is contained within data link layer 608.

In both of the examples in FIGS. 4 and 5,: one of the endpoints, such as server 500 or switch 400, initiates the algorithm negotiation protocol after a link aggregation has been established. The protocol in these illustrative examples is extensible such that other schemes can be added.

As described, the protocol supports basic algorithms for processing data packets transferred across the link aggregation. Examples of algorithms from "better" to "worst" are: (1) source/destination transmission control protocol/user datagram protocol (TCP/UDP) port—the packet's source (or destination) TCP or UDP port is used; (2) source/destination IP address- the last byte of the packet's source (or destination) IP address is used; and (3) source/destination MAC address—the last byte of the packet's source (or destination) MAC address is used.

The protocol in the illustrative examples of the present invention considers the TCP/UDP port algorithm a "better" algorithm because this algorithm can potentially give a better packet distribution than the IP address algorithm, which in turn yields a better packet distribution than the MAC address algorithm. However, if either endpoint is unwilling or unable to use a particular algorithm, the algorithm negotiation protocol falls back to the next desired algorithm for processing data packets. The MAC address algorithm must be available for use by all hosts, which support this protocol. Furthermore, even if the TCP/UDP port algorithm is chosen, if IP packets not carrying a TCP or UDP payloads are sent (e.g. ping packets), then the IP address algorithm is used. If the packet is not IP (e.g. ARP packets), then the MAC address algorithm is used.

As an example of how these algorithms work, with reference again to FIG. 5, suppose that link aggregation 514 is a 3-adapter link aggregation between server 500 and server 502. This aggregation has a source MAC address of 00-11-22-33-44-55. The MAC address algorithm takes the last byte of the MAC address (0x55) and takes the modulus of the number of adapters (0x55 modulus 3=1) to determine which adapter to use. Using the modulus operator ensures that the result of the operation is less than the number of adapters in the aggregation. In this illustrative example, since the result of the operation is 1, the packets are sent on the second adapter in the aggregation (the numbering starts at zero). The numbering of adapters is outside the scope of this protocol, but it should be noted that ports are already uniquely identified with a number by the underlying IEEE 802.3ad protocol.

In other words, the algorithm negotiation protocol in the illustrative examples ensures that both endpoints support the same algorithm. When a convergence has occurred, both endpoints, such as server 500 and server 502 in FIG. 5 know which algorithm each one should use to make sure that packets are sent and received over the same adapter.

In the illustrative examples, the algorithm negotiation protocol is designed to exist on top of an existing link aggregation protocol. As a result, the protocol of the present invention may be very light-weight. In these illustrations, only 4 octets are required for a protocol data unit (PDU) to reach convergence.

Figure 7:
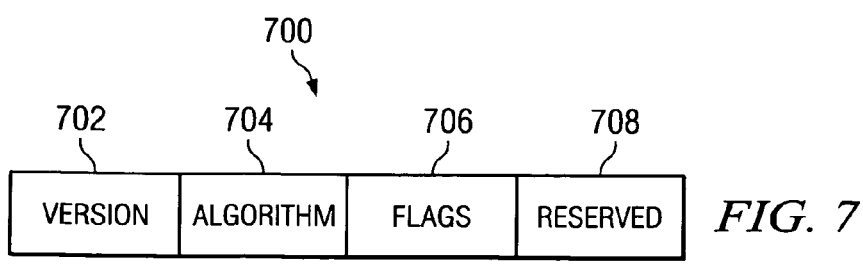
FIG. 7 is an example of a data protocol unit in accordance with a preferred embodiment of the present invention.

With reference now to FIG. 7, an example of a data protocol unit is depicted in accordance with a preferred embodiment of the present invention. Protocol data unit 700 contains 4 octets. These octets include version 702, algorithm 704, flags 706 and reserved 708. Version 702 is a field that contains the version number of the algorithm negotiation protocol. Algorithm 704 identifies the algorithm that is selected by an endpoint. Flags 706 are used to send information between the endpoints. Reserved 708 is provided to allow expansion of the protocol at a later time.

The values for algorithm 704 are defined as follows for a protocol version 1 in these illustrative examples: 0-source MAC address; 1-destination MAC address; 2-source IP address; 3-destination IP address; 4-TCP/UDP source port; and 5-TCP/UDP destination port.

In these examples, the "sender" is the host or endpoint sending the packet data unit. The values for flags 706 are defined as follows (where bit 0 is the least significant bit in the octet): bit 0 indicates whether the algorithm has converged; bit 1 identifies if the sender wants to be a master or slave; and bits 2-7 are reserved for future use.

In bit 0, a value of 0 means that the algorithm has not yet converged, while a value of 1 means that the algorithm has converged. The value of bit 1 is set equal to 0 if the sender wants to act as a slave and is set equal to 1 if the sender wants to act as a master in the conversation in which the link aggregation is formed.

In these illustrative examples, the "master," is the initiating endpoint that wants to select the algorithm, while the "slave" is a responding endpoint that chooses the complementary algorithm chosen by the initiating endpoint. Of course, the initiating endpoint could be the slave depending on the particular situation.

If the initiating endpoint would like to use TCP/UDP source port, the responding endpoint chooses TCP/UDP destination port if the responding endpoint can support this algorithm. In these examples, the algorithm negotiation occurs between a host and a switch, in which the host is the initiating endpoint and the switch is the responding endpoint. The host requests that it be the master, while the switch implementation will announce itself as the slave. This situation occurs in this example because the user is usually the one who "cares" which algorithm is used (e.g. to achieve better distribution for its more common type of traffic), while the switch is a passive network element, which does not usually care one way or the other. However, if both endpoints choose "master" or both endpoints choose "slave," the endpoint with the numerically higher MAC address will be the master, and the other one will be the slave in these illustrative examples.

With a typical packet data unit exchange to achieve convergence, an initiating endpoint that desires to be a master sends a packet data unit stating its preferred algorithm in algorithm 704 when the protocol starts. Further, this initiating endpoint also sets bit 1 in flags 706 to tell the other endpoint that it wants to be the master in the negotiation.

If the responding endpoint supports the algorithm specified by the initiating endpoint, the responding endpoint sends a reply packet data unit specifying the complementary algorithm of what the initiating endpoint specified in algorithm 704. For example, if the initiating endpoint specified "TCP/UDP source port," value 4, the responding endpoint sends "TCP/UDP destination port," value 5 in algorithm 704 in a reply packet data unit. The responding endpoint also sets bit 0 in flags 706 in the reply packet data unit to tell the initiating endpoint that the algorithm has converged as far as it is concerned.

When the initiating endpoint receives this packet data unit, the initiating endpoint then sends a reply of its own with the same algorithm value and bit 0 of the flags bit set. Now both endpoints know that convergence has occurred and that the endpoints should start using the agreed-upon algorithm for distribution of data packets.

On the other hand, when the slave does not support the algorithm specified in the packet data unit sent by the initiating endpoint, the protocol negotiates an algorithm that is supported by both the master and the slave. In response to receiving the packet data unit from the initiating endpoint, the responding endpoint sends a reply packet data unit stating its preferred algorithm in algorithm 704 and bits 0 and 1 are cleared to a logic 0 in flags 706 to mark itself as the slave and to state that convergence has not yet occurred. In this case, the initiating endpoint may determine whether the algorithm selected by the responding endpoint is supported. If this algorithm is supported, a reply packet data unit is sent to the responding endpoint to indicate that convergence has occurred. The preferred algorithm for use in processing data packets may be selected from a list and the two endpoints in this example may traverse the list until an algorithm supported by both endpoints is found in these illustrative examples.

When the protocol has converged, the host or initiating endpoint will use the source TCP port of all outgoing packets to determine which adapter to send them on. Conversely, the switch, the responding endpoint in this example, uses the destination TCP port of all incoming data packets to determine which adapter to send them on. This situation means that both endpoints are using the same value for their calculations. Since they are both using complementary algorithms and using the same value on which to operate, it is guaranteed that both sides will end up sending the packets on the same adapter, i.e. the adapter that contains the TCP state necessary to process them.

In another illustrative example, the responding endpoint sends a reply packet data unit, telling the initiating endpoint that the responding endpoint does not support the algorithm suggested by the responding endpoint, but rather the next one down the list. In this example, the algorithm is "source IP address". In this case, the initiating endpoint would then send a second reply packet data unit specifying the "destination IP address" algorithm with bits 1 and 0 set to a logic 1 in flags 706 in FIG. 7. This information tells the responding endpoint that the initiating endpoint is willing to use the IP address algorithm instead, and that as far as the initiating endpoint is concerned, the algorithm has converged. The responding endpoint then responds with a third reply packet data unit containing the same algorithm value and bit 0 set in flags 706. Now both endpoints have agreed on an algorithm for processing data packets in the link aggregation formed between the endpoints.

As a final example, assume that the responding endpoint sends a reply data packet unit in response to the initial packet data unit that specifies an algorithm that the initiating endpoint itself does not support. The initiating endpoint responds by sending a reply packet data unit specifying the next lowest algorithm that is supported by the initiating endpoint. In this case, bit 1 in flags 706 is set, but bit 0 is cleared since convergence has not occurred.

In response to this packet data unit from the initiating endpoint, the responding endpoint returns a packet data unit specifying the complementary algorithm specified by the initiating endpoint if this algorithm is supported by the responding endpoint. If the algorithm is not supported, a next lowest algorithm supported by the responding endpoint is returned if the responding endpoint does not support the algorithm suggested by the initiating endpoint. This process in the algorithm negotiation protocol continues until convergence is achieved.

Although the illustrative examples show only three sets of algorithms, other numbers of protocols may be used depending on the implementation. Further, through the inclusion of at least using source and destination MAC addresses in the set of algorithms, convergence always occurs because at worst the negotiation will continue until this algorithm is reached.

Figure 8:
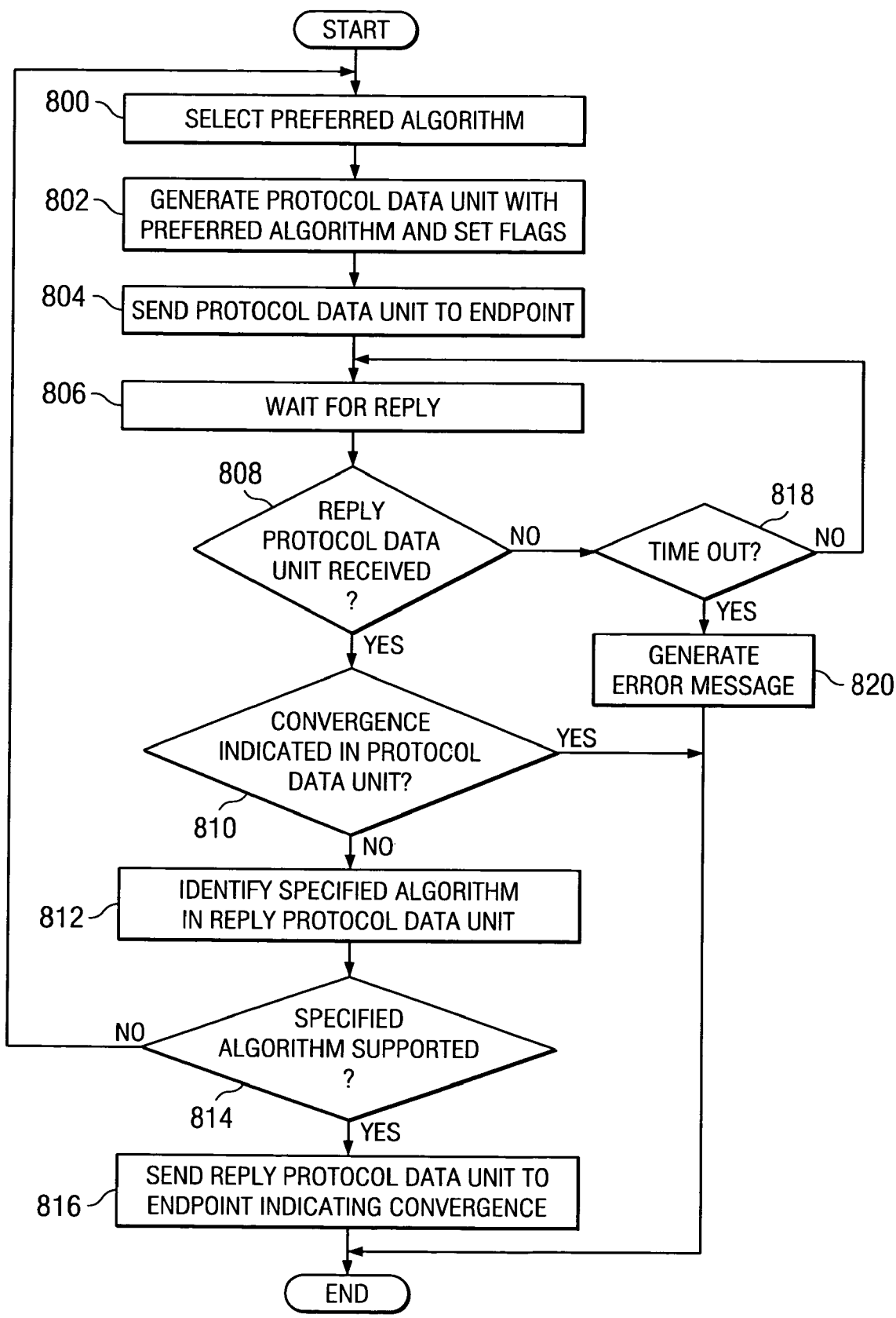
FIG. 8 is a flowchart of a process for initiating negotiation of an algorithm for processing data packets in a link aggregation in accordance with a preferred embodiment of the present invention.

With reference now to FIG. 8, a flowchart of a process for initiating negotiation of an algorithm for processing data packets in a link aggregation is depicted in accordance with a preferred embodiment of the present invention. The process illustrated in FIG. 8 may be implemented in data processing system, such as data processing system 200 in FIG. 2. Of course, this process may be implemented in other endpoints in a link aggregation, such as a switch or router. More particularly this mechanism may be implemented in a algorithm negotiation protocol, such as algorithm negotiation protocol 612 in FIG. 6. This process is used by an initiating endpoint as described above in the illustrative examples.

The process begins by selecting a preferred algorithm (step 800). The preferred algorithm is selected from a list of algorithms that may be used to process data packets. In these examples, the list is ordered from most preferred to least preferred.

Next, a protocol data unit is generated with a value identifying the preferred algorithm and flags set with different values (step 802). This protocol data unit may be, for example, protocol data unit 700 in FIG. 7. Then, the protocol data unit is sent to the endpoint (step 804). The endpoint in step 804 is the responding endpoint in these examples.

Thereafter, the process waits to receive a reply from the responding endpoint to the link aggregation (step 806). Then, a determination is made as to whether the reply protocol data unit is received from the responding endpoint (step 808). If the reply protocol data unit is received, then a determination is made as to whether convergence is indicated in the protocol data unit (step 810). Convergence may be identified from a flags field, such as flags 706 in FIG. 7. If convergence is not indicated in the protocol data unit, a specified algorithm is identified in the reply protocol data unit (step 812). This algorithm is one selected by the responding endpoint. Then, a determination is made as to whether the specified algorithm is supported (step 814). If the specified algorithm is supported, then a reply protocol data unit is sent to the endpoint indicating convergence (step 816) with the process terminating thereafter.

Referring back to step 808, if the reply protocol data unit is not received, then a determination is made as to whether a time out has occurred (step 818). If a time out has occurred, then an error message is generated (step 820) with the process terminating thereafter. However, if a time out has not occurred, then the process proceeds to step 806 as described above.

Back in step 810, if coverage is indicated in protocol data unit, then the process terminates thereafter. In step 814, if the specified algorithm is not supported, then the process returns to step 800 to select the next preferred algorithm.

Figure 9:
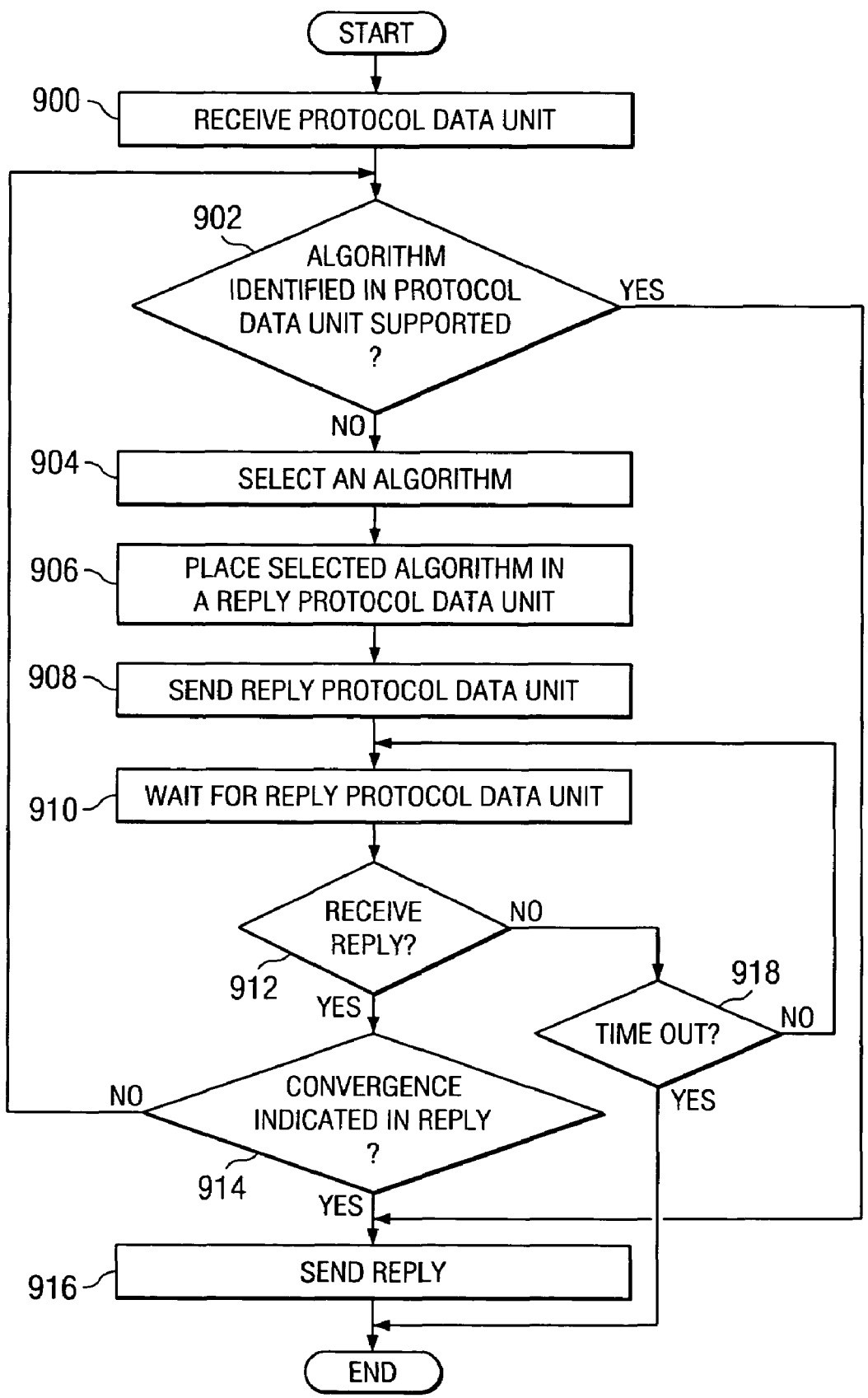
FIG. 9 is a flowchart of a process for negotiating an algorithm for use in processing data packets in a link aggregation in accordance with a preferred embodiment of the present invention.

With reference now to FIG. 9, a flowchart of a process for negotiating an algorithm for use in processing data packets in a link aggregation is depicted in accordance with a preferred embodiment of the present invention. The process illustrated in FIG. 9 may be implemented in data processing system, such as data processing system 200 in FIG. 2. Of course, this process may be implemented in other endpoints in a link aggregation, such as a switch or router. More particularly this mechanism may be implemented in a algorithm negotiation protocol, such as algorithm negotiation protocol 612 in FIG. 6. This process is used by a responding endpoint as described above in the illustrative examples.

The process begins by receiving a protocol data unit (step 900). This protocol data unit is received from an initiating endpoint. Next, a determination is made as to whether the algorithm identified in the protocol data unit is supported (step 902). If the algorithm identified in the protocol data unit is not supported, then an algorithm is selected (step 904). The algorithm may be selected from a list or set of algorithms based on a selection scheme.

Next, the selected algorithm is placed in a reply protocol data unit (step 906). Then, the reply protocol data unit is sent to the initiating endpoint (step 908). Next, the process waits for the reply protocol data unit from the initiating endpoint (step 910). A determination is made as to whether a reply is received (step 912). If a reply is received, then a determination is made as to whether convergence is indicated in the reply (step 914). If convergence is indicated in the reply, then a reply is returned to the initiating endpoint to confirm the convergence (step 916) with the process terminates thereafter.

Referring back to step 902, if the algorithm identified in the protocol data unit is supported, then the process proceeds to step 916 as described above. In step 912, if a reply is not received, then a determination is made as to whether a time out is needed (step 918). If a time out is needed, then the process terminates thereafter. However, if a time out is not needed, then the process proceeds to step 910 as described above. In step 914, if convergence is not indicated in the reply, then the process proceeds to step 902 as described above.

Thus, the present invention provides an improved method, apparatus, and computer instructions for processing data packets send or distributed through a link aggregation. The mechanism of the present invention provides a process for deciding what algorithm is to be used by the endpoints in transferring data packets across the link aggregation By using this protocol of the present invention the link aggregation process can be fully automated and at the same time work seamlessly with TCP-offloaded adapters by guaranteeing that packets are sent and received on the same adapter for the same connection.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for negotiating a protocol for a conversation in which data packets are transmitted, the method comprising:

responsive to establishment of a link aggregation with an endpoint for the conversation, selecting one of a plurality of algorithms to be used by the data processing system and the endpoint to select one of a plurality of adapters to use to transmit the data packets in the conversation, the selected one of the plurality of algorithms forming a preferred algorithm;

sending a request to the endpoint, wherein the request indicates the preferred algorithm for processing the data packets in the conversation;

receiving a reply to the request from the endpoint;

using the reply to determine whether the endpoint supports the preferred algorithm;

responsive to a determination that the endpoint supports the preferred algorithm, transmitting the data packets using one of the plurality of adapters that was selected using the preferred algorithm;

wherein the request is a protocol data unit;

responsive to a determination that the endpoint supports the preferred algorithm, determining that link aggregation has occurred; and wherein the protocol data unit includes a flag field, which includes a first bit identifying whether link aggregation has occurred and a second bit indicating whether a master or slave role is requested.

2. The method of claim 1, wherein the reply is a first reply and further comprising:

responsive to a determination that the endpoint does not support the preferred algorithm, identifying an alternate algorithm specified in the first reply, wherein the endpoint specified the alternate algorithm;

determining whether the alternate algorithm is supported in the data processing system;

responsive to a determination that the alternate algorithm is supported in the data processing system, sending a second reply to the endpoint indicating that the data processing system supports the alternate algorithm; and transmitting the data packets using one of the plurality of adapters that was selected using the alternate algorithm.

3. The method of claim 1, wherein the determining step includes:

determining whether the reply specifies a complementary algorithm of the preferred algorithm.

4. The method of claim 2, wherein the data processing system indicates in the second reply that it supports the alternate algorithm by specifying a complementary algorithm to the alternate algorithm.

5. The method of claim 1, wherein the preferred algorithm is selected from one of a source media access control address algorithm, a destination media access control address algorithm, a source Internet Protocol address algorithm, a destination Internet Protocol address algorithm, a transmission control protocol/user datagram protocol source port algorithm, and a transmission control protocol/user datagram protocol source port algorithm.

6. The method of claim 1, wherein the protocol data unit includes an identification of an algorithm field and a flag field.

* * * * *